US006981039B2

(12) United States Patent
Cerami et al.

(10) Patent No.: US 6,981,039 B2
(45) Date of Patent: Dec. 27, 2005

(54) FAULT MANAGEMENT IN A VDSL NETWORK

(75) Inventors: Richard S. Cerami, Denver, CO (US); Timothy Figueroa, Aurora, CO (US); Roxanna Storaasli, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 610 days.

(21) Appl. No.: 09/921,276

(22) Filed: Aug. 1, 2001
(Under 37 CFR 1.47)

(65) Prior Publication Data

US 2002/0073062 A1   Jun. 13, 2002

Related U.S. Application Data

(60) Provisional application No. 60/222,791, filed on Aug. 1, 2000.

(51) Int. Cl.[7] ........................................... G06F 15/173
(52) U.S. Cl. ................. 709/223; 709/224; 714/2; 714/27; 714/43; 714/44; 714/47; 714/56; 714/100; 379/9; 379/9.03; 370/216; 370/218; 370/225
(58) Field of Search ..................... 709/223, 224; 370/216, 218, 225; 714/47, 2, 27, 44, 56, 714/100; 379/9, 9.03

(56) References Cited

U.S. PATENT DOCUMENTS

| 5,097,469 A | 3/1992 | Douglas |
| 5,261,044 A | 11/1993 | Dev et al. |
| 5,295,244 A | 3/1994 | Dev et al. |
| 5,504,863 A | 4/1996 | Yoshida |
| 5,504,921 A | 4/1996 | Dev et al. |
| 5,650,994 A | 7/1997 | Daley |
| 5,655,081 A | 8/1997 | Bonnell et al. |
| 5,666,481 A | 9/1997 | Lewis |
| 5,680,325 A | 10/1997 | Rohner |
| 5,692,030 A | 11/1997 | Teglovic et al. |
| 5,737,319 A | 4/1998 | Croslin et al. |
| 5,751,933 A | 5/1998 | Dev et al. |
| 5,768,614 A | 6/1998 | Takagi et al. |
| 5,799,154 A | 8/1998 | Kuriyan |
| 5,812,529 A | 9/1998 | Czarnik et al. |
| 5,850,388 A | 12/1998 | Anderson et al. |
| 5,870,558 A | 2/1999 | Branton, Jr. et al. |
| 5,872,911 A | 2/1999 | Berg |
| 5,881,048 A | 3/1999 | Croslin |
| 5,892,812 A | 4/1999 | Pester, III |
| 5,892,937 A | 4/1999 | Caccavale |
| 5,920,846 A | 7/1999 | Storch et al. |
| 5,946,373 A | 8/1999 | Harris |
| 5,953,389 A | 9/1999 | Pruett et al. |

(Continued)

*Primary Examiner*—Saleh Najjar
*Assistant Examiner*—ThuHa Nguyen
(74) *Attorney, Agent, or Firm*—Brian N. Young; Townsend and Townsend and Crew, LLP

(57) ABSTRACT

A method for managing a plurality of failures in a video and data network is provided. The method includes discovering a failure in the video and data network. The discovered failure is the root cause of the failure. Next, the root cause failure is correlated with the plurality of failures to determine related failures generated as a result of the root cause failure. The related failures are then suppressed. One or more user's affected by the root cause failure are determined. If the root cause failure is automatically resolvable, the root cause failure is automatically resolved.

22 Claims, 11 Drawing Sheets

U.S. PATENT DOCUMENTS

| | | |
|---|---|---|
| 5,958,009 A | 9/1999 | Friedrich et al. |
| 5,974,237 A | 10/1999 | Shurmer et al. |
| 5,978,358 A | 11/1999 | Wang et al. |
| 5,987,514 A * | 11/1999 | Rangarajan ................. 709/224 |
| 5,991,264 A * | 11/1999 | Croslin ....................... 370/225 |
| 5,995,485 A * | 11/1999 | Croslin ....................... 370/216 |
| 5,999,179 A | 12/1999 | Kekic et al. |
| 5,999,540 A | 12/1999 | McGhee |
| 6,002,996 A | 12/1999 | Burks et al. |
| 6,006,016 A | 12/1999 | Faigon et al. |
| 6,018,300 A | 1/2000 | Dowden et al. |
| 6,023,456 A | 2/2000 | Chapman et al. |
| 6,038,212 A * | 3/2000 | Galand et al. ............. 370/216 |
| 6,058,103 A * | 5/2000 | Henderson et al. ......... 370/254 |
| 6,081,517 A | 6/2000 | Liu et al. |
| 6,085,243 A | 7/2000 | Fletcher et al. |
| 6,147,975 A | 11/2000 | Bowman-Amuah |
| 6,148,335 A | 11/2000 | Haggard et al. |
| 6,160,810 A | 12/2000 | Brodigan |
| 6,169,724 B1 | 1/2001 | Begum et al. |
| 6,195,697 B1 | 2/2001 | Bowman-Amuah |
| 6,199,180 B1 | 3/2001 | Ote et al. |
| 6,205,563 B1 * | 3/2001 | Lewis ......................... 714/47 |
| 6,208,637 B1 | 3/2001 | Eames |
| 6,209,033 B1 | 3/2001 | Datta et al. |
| 6,233,449 B1 | 5/2001 | Glitho et al. |
| 6,249,883 B1 | 6/2001 | Cassidy et al. |
| 6,269,330 B1 | 7/2001 | Cidon et al. |
| 6,285,748 B1 | 9/2001 | Lewis |
| 6,327,669 B1 | 12/2001 | Croslin |
| 6,349,333 B1 * | 2/2002 | Panikatt et al. ............. 709/223 |
| 6,374,288 B1 | 4/2002 | Bhagavath et al. |
| 6,388,990 B1 | 5/2002 | Wetzel |
| 6,430,150 B1 * | 8/2002 | Azuma et al. ............... 370/218 |
| 6,446,123 B1 | 9/2002 | Ballantine et al. |
| 6,463,079 B2 | 10/2002 | Sundaresan et al. |
| 6,480,901 B1 | 11/2002 | Weber et al. |
| 6,484,200 B1 * | 11/2002 | Angal et al. ................ 709/224 |
| 6,499,017 B1 | 12/2002 | Feibelman et al. |
| 6,542,266 B1 | 4/2003 | Phillips et al. |
| 6,556,659 B1 | 4/2003 | Bowman-Amuah |
| 6,571,285 B1 * | 5/2003 | Groath et al. ............... 709/223 |
| 6,578,077 B1 | 6/2003 | Rakoshitz et al. |
| 6,580,727 B1 | 6/2003 | Yim et al. |
| 6,597,660 B1 | 7/2003 | Rueda et al. |
| 6,597,689 B1 | 7/2003 | Chiu et al. |
| 6,604,137 B2 | 8/2003 | Cowan et al. |
| 6,611,867 B1 | 8/2003 | Bowman-Amuah |
| 6,631,407 B1 | 10/2003 | Mukaiyama et al. |
| 6,647,414 B1 | 11/2003 | Eriksson et al. |
| 6,711,137 B1 | 3/2004 | Klassen et al. |
| 6,760,847 B1 | 7/2004 | Liu et al. |
| 6,765,864 B1 * | 7/2004 | Natarajan et al. ........... 370/224 |
| 6,765,873 B1 | 7/2004 | Fichou et al. |
| 6,775,303 B1 | 8/2004 | Rustad et al. |
| 6,785,296 B1 | 8/2004 | Bell |
| 6,788,765 B1 | 9/2004 | Beamon |
| 6,804,714 B1 | 10/2004 | Tummalapalli |
| 6,891,825 B1 | 5/2005 | O'Dell et al. |
| 2002/0073062 A1 | 6/2002 | Cerami et al. |
| 2002/0073355 A1 | 6/2002 | Cerami et al. |
| 2002/0078017 A1 | 6/2002 | Cerami et al. |
| 2003/0149919 A1 | 8/2003 | Greenwald et al. |

* cited by examiner

FAULT MANAGEMENT IN A VDSL NETWORK

CLAIM OF PRIORITY

This application claims priority from U.S. Provisional Patent Application No. 60/222,791, filed Aug. 1, 2000, entitled MANAGEMENT OF VIRTUAL AND PHYSICAL NETWORK INVENTORIES, which is hereby incorporated by reference, as is set forth in full in this document, for all purposes.

CROSS-REFERENCES TO RELATED APPLICATIONS

This application is related to the co-pending applications Ser. No. 09/921,282 entitled "MANAGEMENT OF VIRTUAL AND PHYSICAL NETWORK INVENTORIES"; Ser. No. 09/921,285 entitled "PROVISIONING SYSTEM AND METHOD FOR AUTO-DISCOVERING CUSTOMER PREMISES EQUIPMENT IN ACTIVATING xDSL"; Ser. No. 09/921,294 entitled "PERFORMANCE MODELING IN A VDSL NETWORK"; Ser. No. 09/921,277 entitled "FAULT MANAGEMENT IN A VDSL NETWORK"; Ser. No. 09/921,283 entitled "PROACTIVE REPAIR PROCESS IN THE xDSL NETWORK (WITH A VDSL FOCUS)"; Ser. No. 09/921,275 entitled "PROACTIVE SERVICE REQUEST MANAGEMENT AND MEASUREMENT", and Ser. No. 09,921,274 entitled, "LINKING ORDER ENTRY PROCESS TO REALTIME NETWORK INVENTORIES AND CAPACITIES", all filed Aug. 1, 2001, the disclosures of which are incorporated herein by reference.

BACKGROUND OF THE INVENTION

The present invention relates to fault management of a broadband network and more specifically to fault management of a xDSL network.

As networks develop to provide more sophisticated services to consumers, such as broadband services including video, telephony, and data services, networks become more complicated to manage. Some network components include the ability to report problems to a central location. Also, some networks do not have this ability and rely on manual referrals from representatives who have inspected the network. Once receiving an indication of an alarm at the central location, a service representative manually filters and correlates the alarm. Although the network is able to report a failure, the network has little or no filtering or correlation capabilities and cannot automatically map the failure to the customers that would be affected by the failure. Thus, the service representative manually analyzes the failure, determines the cause of the failure, and correlates customers affected by the failure. In order to determine the cause and the customers affected, the service representative must have extensive knowledge of the network, the network topology, and customer records.

With the large number of alarms the service provider receives, the process of analyzing an alarm becomes very time consuming and costly. Additionally, by the time the problem is isolated, if the problem is isolated at all, another customer may have already called the service representative and had the problem isolated. Thus, all the efforts of the service representative analyzing the failure were wasted.

BRIEF SUMMARY OF THE INVENTION

In one embodiment, a method for managing a plurality of failures in a video and data network is provided. In one embodiment, the method includes discovering a failure in the video and data network. The discovered failure is the root cause of the failure. Next, the root cause failure is correlated with the plurality of failures to determine related failures generated as a result of the root cause failure. The related failures are then suppressed. One or more user's affected by the root cause failure are determined. If the root cause failure is automatically resolvable, the root cause failure is automatically resolved.

In one embodiment, the video and data network comprises a type of digital subscriber line (xDSL) network, such as a Very high bit rate DSL (VDSL) network.

A further understanding of the nature and advantages of the invention herein may be realized by reference of the remaining portions in the specifications and the attached drawings.

DETAILED DESCRIPTION OF THE INVENTION

Figure 1:
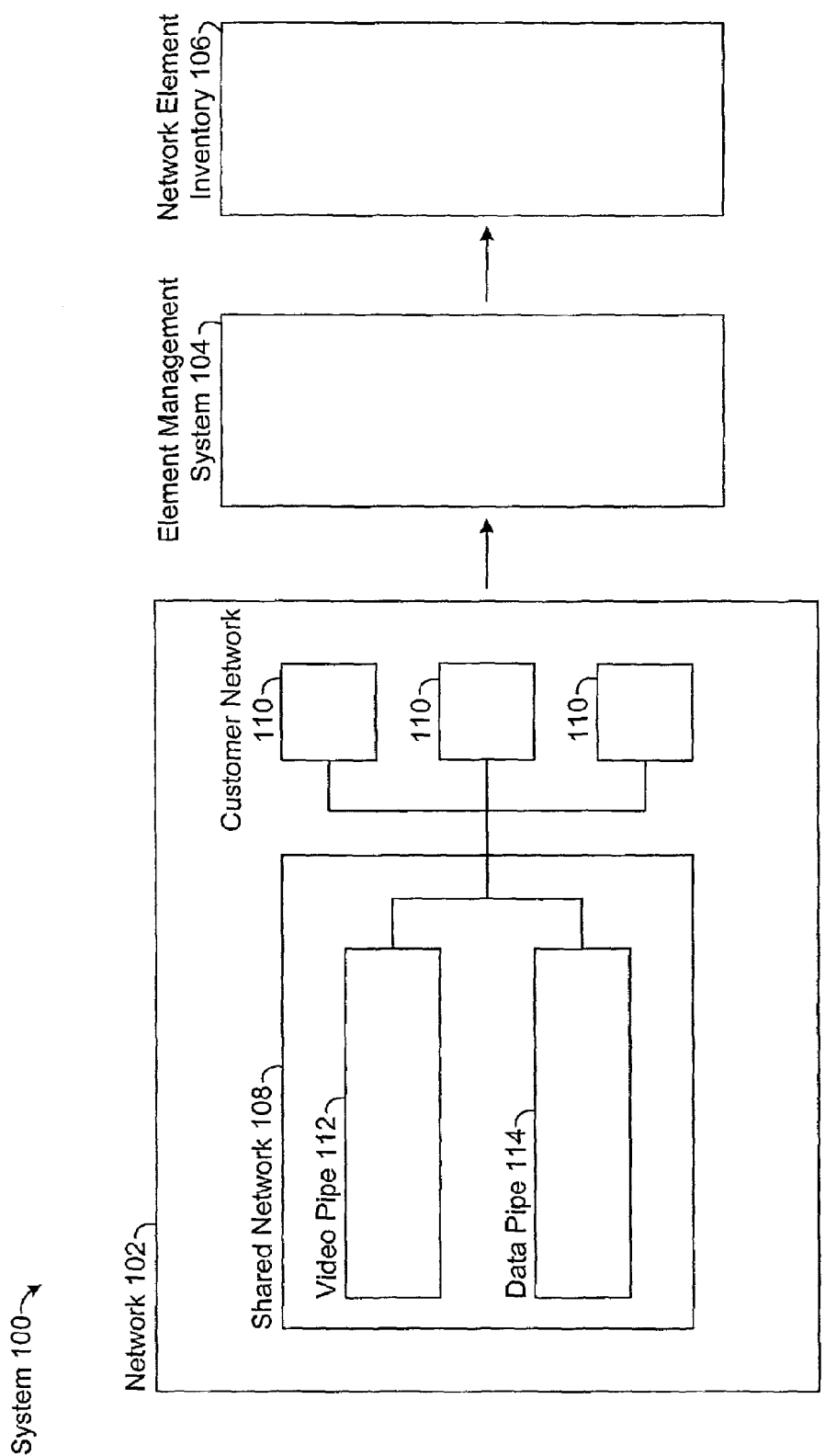
FIG. 1 illustrates one embodiment of a video, data and/or telephony network, including a network element inventory.

FIG. 1 illustrates a system 100 including a network 102 and a network element inventory 106. As shown, network 102, an element management system 104, and network element inventory 106 are included.

Network 102 may be any network capable of delivering telephony, or high speed data to customers. In one embodiment, network 102 is a xDSL network capable of delivering telephony, video, and/or data to customers at high speeds. It is noted for purposes of understanding the present invention, the term xDSL is used as a broad label for identifying a number of different types of digital subscriber line (DSL) signal formats, such as rate adaptive DSL (RADSL), Asymmetric DSL (ADSL), high-bit-rate DSL (HDSL), and very-high-data-rate DSL (VDSL). Compatibility for two or more of these formats within the same distribution system may also be provided.

As shown, network 102 includes a shared network 108 and a plurality of customer networks 110. Customer networks 110 may be any network connecting the customer to shared network 108. A customer network in the plurality of customer networks 110 may be an individual network for one customer or a network for a group of customers. Network 102 includes a plurality of network elements that deliver video and data through network 102.

Shared network 108 may be any network that is shared among plurality of customer networks 110. Shared network 108 handles the flow of telephony, video, and/or data from a service provider and routes signals to plurality of customer networks 110, which in turn, routes the signals to individual customers. Additionally, shared network 108 includes a video pipe 112 and data pipe 114. Video pipe 108 delivers video to plurality of customer networks 110 and data pipe 114 delivers data to plurality of customer networks 110. Shared network 108 also may be configured to provide telephony service to customers, for example through data pipe 114, or telephony service may be provided through a public switch at a central office, as discussed below.

Element Management System (EMS) 104 may be any application capable of receiving/discovering data from shared network 108 and plurality of customer networks 110. In one embodiment, EMS 104 is the only system that may configure and/or access data from shared network 108 and plurality of customer networks 110. The data received from the network may include, for example, performance data, fault data, and an inventory of network elements. Additionally, EMS 104 may include customer data, which includes data relating customers to designated physical and logical paths in shared network 108 and plurality of customer networks 110. In one embodiment, multiple EMS 104s may be included and discover data from various elements to network 102.

Network element inventory 106 may be any database capable of storing data relating to network 102. In one embodiment, the network element inventory 106 may receive data from shared network 108 and plurality of customer networks 110 directly thereby removing the need for EMS 104. Network element inventory 106 includes network discovered physical inventory, network discovered logical inventory, and planned network inventory in one embodiment. In one embodiment, network element inventory 106 is as described in co-pending U.S. application Ser. No. 09/921,282 entitled "MANAGEMENT OF VIRTUAL AND PHYSICAL NETWORK INVENTORIES".

Figure 2:
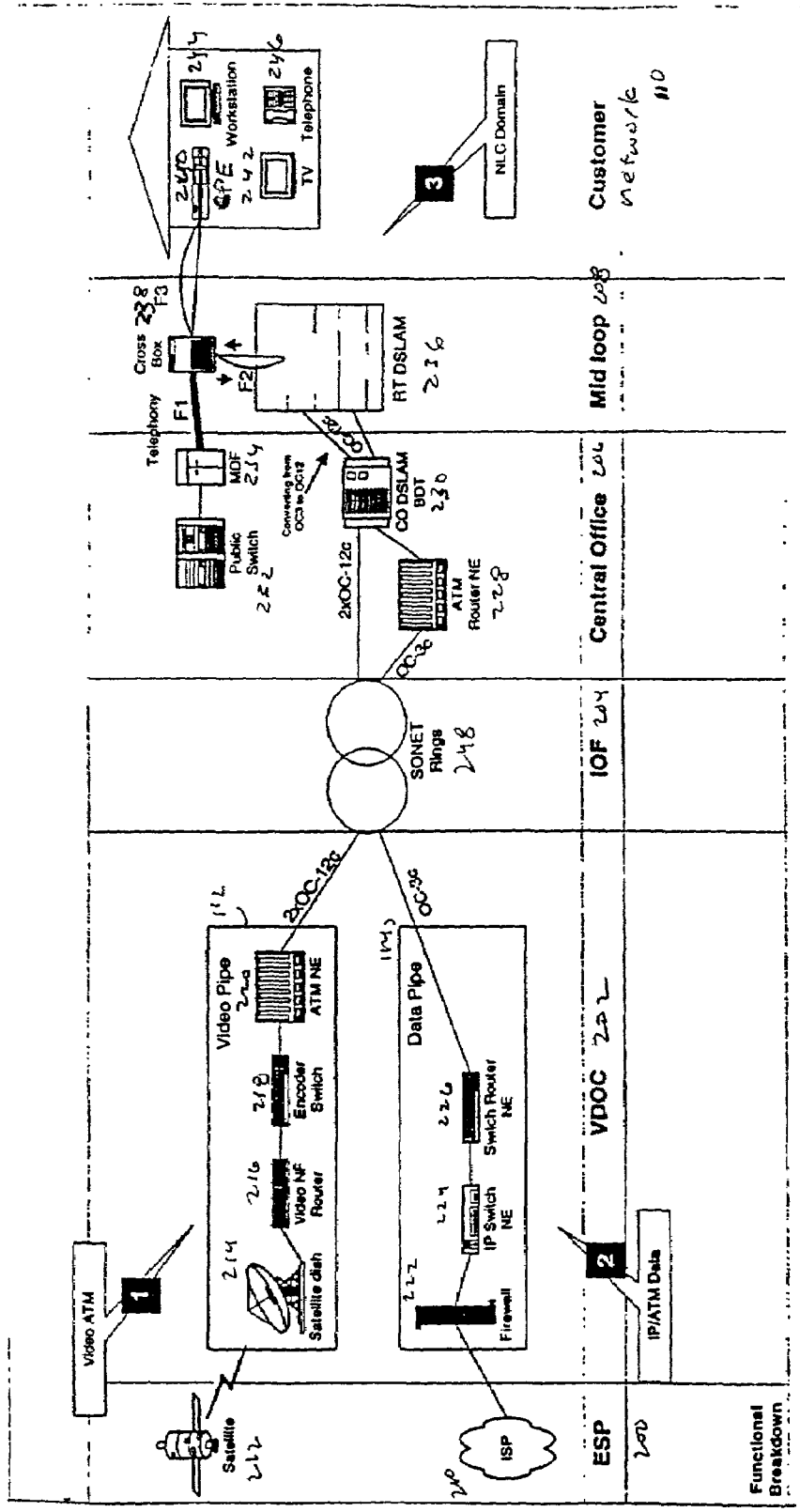
FIG. 2 illustrates one embodiment of an xDSL network.

In FIG. 2, network 102 is shown in more detail according to one embodiment. As shown, shared network 108 includes an external service provider section (ESP) 200, a video/data operation center (VDOC) 202, an interoffice facility (IOF) 204, central office (CO) 206, and midloop 208. In one embodiment, ESP 200 includes ISP 210 and satellite 212. ISP 210 provides access to the Internet and other data services. Satellite 212 provides access to video and other video services. While the data and video providers are shown as ISP and satellite providers, it will be understood by a person skilled in the art that other ways of providing video and data services are possible.

VDOC 202 includes video pipe 112 and data pipe 114 of FIG. 1. In one embodiment, video pipe 112 can be configured to deliver video signals to and from ESP 200 and/or IOF 204 through optic fiber, such as OC-12c, and data pipe 114 can be configured to deliver data to and from the ESP 200 and/or IOF 204 through optic fiber, such as OC-3c. However, in accordance with other embodiments of the invention, video pipe 112 and data pipe 114 can utilize any other suitable broadband connection deliver the video and data signals, such as other forms of fiber optics, wireless technologies, or the like. Thus, the present invention is not limited to the illustrated embodiment.

In one embodiment, video pipe 112 delivers video using a video asynchronous transfer mode (ATM) based protocol. In one embodiment, data pipe 114 delivers data using an Internet Protocol (IP) based protocol.

Video pipe 112 includes a satellite dish 214, video router 216, encoder switch 218, and ATM network element (NE) 220. Data pipe 114 includes a firewall 222, IP switch network element 224, and switch router network element 226. It should be understood that a person of skill in the art will appreciate other ways of implementing video and data pipes, such as video head-ends currently known in the art.

IOF 204 includes synchronous optical network rings (SONET) 248. SONET 248 may be any optical network capable of delivering video and data to and from the VDOC 202 and central office 206.

Central Office (CO) 206 includes an ATM router NE 228 and CO Digital Subscriber Loop Access Module (DSLAM) 230. In one embodiment, CO DSLAM 230 may be a broadband digital terminal (BDT). ATM router NE 224 and CO DSLAM BDT 230 are coupled to IOF 230 and midloop 208 through optic fiber, such as OC-3c and OC-12c. Additionally, CO 206 includes a public switch 230 and Main Distribution Frame (MDF) 234. Public switch 230 and MDF 234 is where an outside customer network is coupled to the shared network. In one embodiment, public switch 232 and MDF 234 provide telephony service to a customer. Additionally, MDF 234 is coupled to midloop section 208.

Midloop 208 includes a RT DSLAM 236 and may include a crossbox 238. Crossbox 238 provides a connection from shared network 108 to plurality of customer networks 10. RT DSLAM 236 may include Universal Service Access Multiplexers (USAM), Multiple Dwelling Units (MDUs) and/or Broadband Network Units (BNUs). Additionally, CO DSLAM 230 is associated to RT DSLAM 236. RT DSLAM 236 may include an Optical Network Unit (ONU), which acts as a router for RT DSLAM 236.

RT DSLAM 236 is a network element that is used to convert optical video and data signals sent from CO DSLAM 230 into electrical signals for deployment to the customer locations over electrical cable connections, such as twisted pair copper cable. The electrical signals may be combined with a telephone signal and are sent to customer's locations. By positioning RT DSLAMs 236 closer to customer locations, the reach of the high speed data service is extended. In one embodiment, RT DSLAM 236 is a node positioned in a neighborhood (fiber-to-the-node deployment) and is configured to convert the optical video and data signals to electrical signals for deployment to a plurality of customer locations via cross box 238 used to serve that neighborhood.

In another embodiment, RT DSLAM 236 is a terminal node for fiber-to-the-curb deployment and feeds service to a customer location directly without the need for cross box 238.

In yet another embodiment, a RT DSLAM 236 is the network element that is suitable for location in a multiple dwelling unit (MDU), such as an office or apartment building. In this particular embodiment, RT DSLAM 236 is a variation of a terminal for fiber-to-the-node deployment and feeds service to the customers in the MDU directly and not through cross box 238 associated with a distribution area (DA).

If midloop 208 includes cross box 238, cross box 238 relays signals from RT DSLAM 236 from midloop 208 to the customer.

As shown, a customer network in plurality of customer networks 110, includes a home network and/or Customer Premise Equipment (CPE) 240. CPE 240 is coupled to the cross box 238 or RT DSLAM 236 if cross box 238 is not present and receives the video, data, and/or telephony signals. CPE 240 may be coupled to a TV 242, workstation 244, and/or telephone 246. Thus, the customer can receive telephony, video, and/or data signals from the network. In one embodiment, CPE 240 may be replaced by other equipment capable of receiving signals from shared network 108.

It will be understood that a person of skill in the art will appreciate other ways of implementing network 102. Thus, network 102 is not limited to the above description.

Overview

Figure 3:
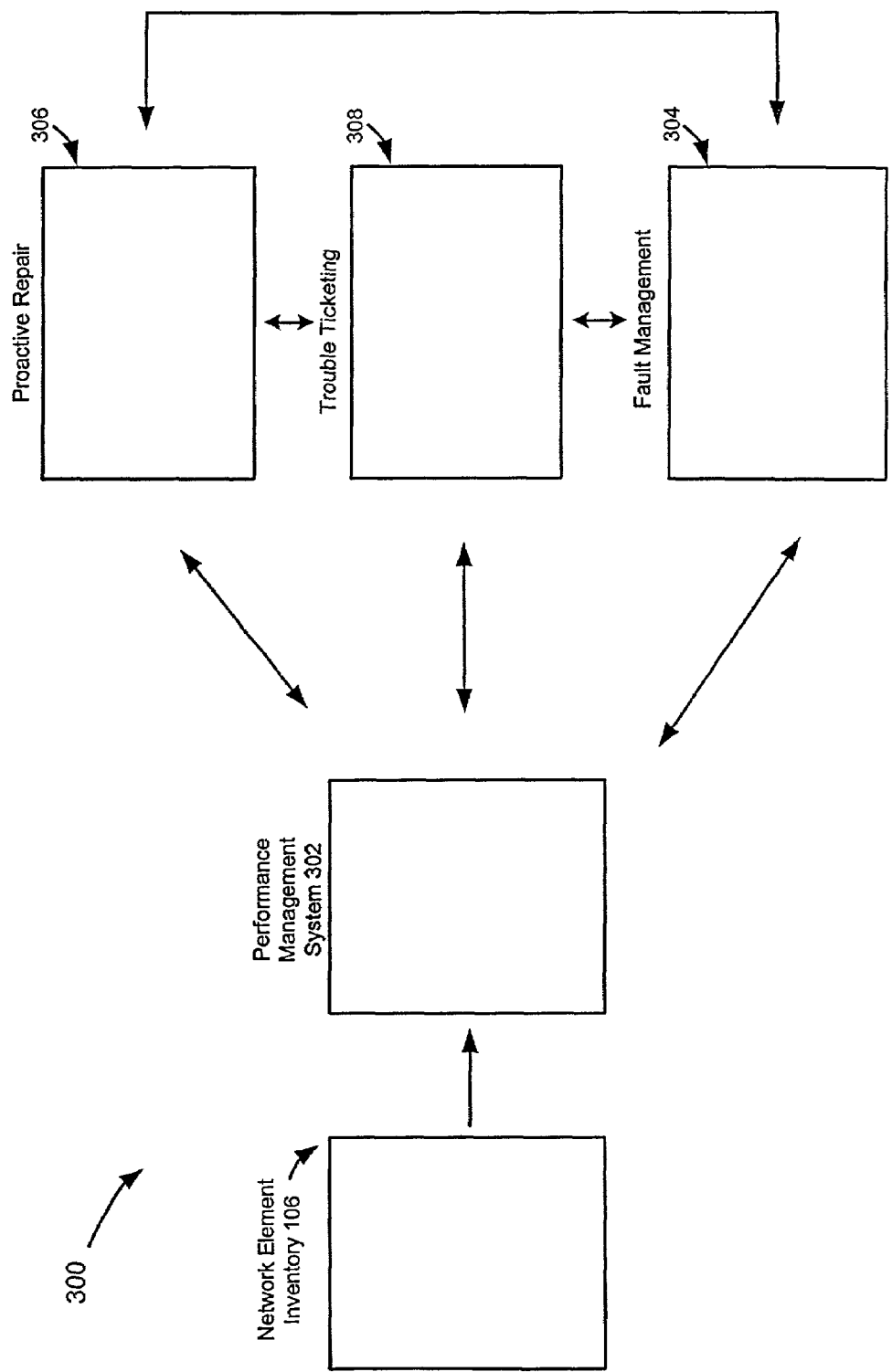
FIG. 3 illustrates an overview of systems of one embodiment of a proactive network management system.

FIG. 3 illustrates an overview of systems of a proactive network management system 300. As shown, a performance management system 302, fault management system 304, proactive repair system 306, trouble ticketing system 308, and network element inventory 106 are included.

Proactive network management system 300 proactively manages faults in network 102 by detecting faults and attempting to resolve the faults. Additionally, if the faults are not automatically resolvable by proactive network management system 300, technicians may be dispatched by the system to fix the faults. All the activities of system 300 are documented and coordinated with a customer service center (not shown). Proactive network management system 300 proactively manages network 102, in contrast to the reactive management driven by customer calls reporting service problems that in turn point to defects in network 102.

In one embodiment, alarms are received by fault management system 304. Fault management system 304 attempts to automatically resolve the problem. During the resolution process, fault management system 304 may communicate with performance management system 302 to receive performance data. Additionally, fault management system 304 communicates the fault to trouble ticketing system 308 for documentation.

Performance management system 302 monitors and gathers performance data for network 102 and stores the data in network element inventory 106. In monitoring performance data, performance management system 302 is able to provide service level assurance for customers. When service degradation is detected, performance management system 306 may communicate with fault management system 304 or proactive repair system 306 to resolve the service degradation. Additionally, the degradation may be communicated to trouble ticketing system 308 for documentation.

Proactive repair system 306 receives faults from performance management system 302 and/or fault management system 304. In one embodiment, the faults that are forwarded to proactive repair system 306 are faults that were not automatically resolvable by fault management system 304. However, in an alternative embodiment, faults may be directly routed to proactive repair system 306. Proactive repair system 306 includes processes to automatically gather and correlate data related to the fault. The data then may be used to create a resolution strategy for a service technician to follow in repairing the fault. Proactive repair system 306 also may communicate with trouble ticketing system 308 to document the fault and the steps required to resolve the fault.

Trouble ticketing system 308 receives fault indications from performance management system 302, fault management system 304, and/or proactive repair system 306. Trouble ticketing system 308 also may receive fault indications from outside customers. Trouble ticketing system 308 synchronizes performance management system 302, fault management system 304, and proactive repair system 306 with a customer service center. By synchronizing data from systems 302, 304 and 306, trouble ticketing system 308 can be used by customer service representatives (CSRs) to report known fault problems and repair efforts to customers when they call in.

Performance Management

Figure 4:
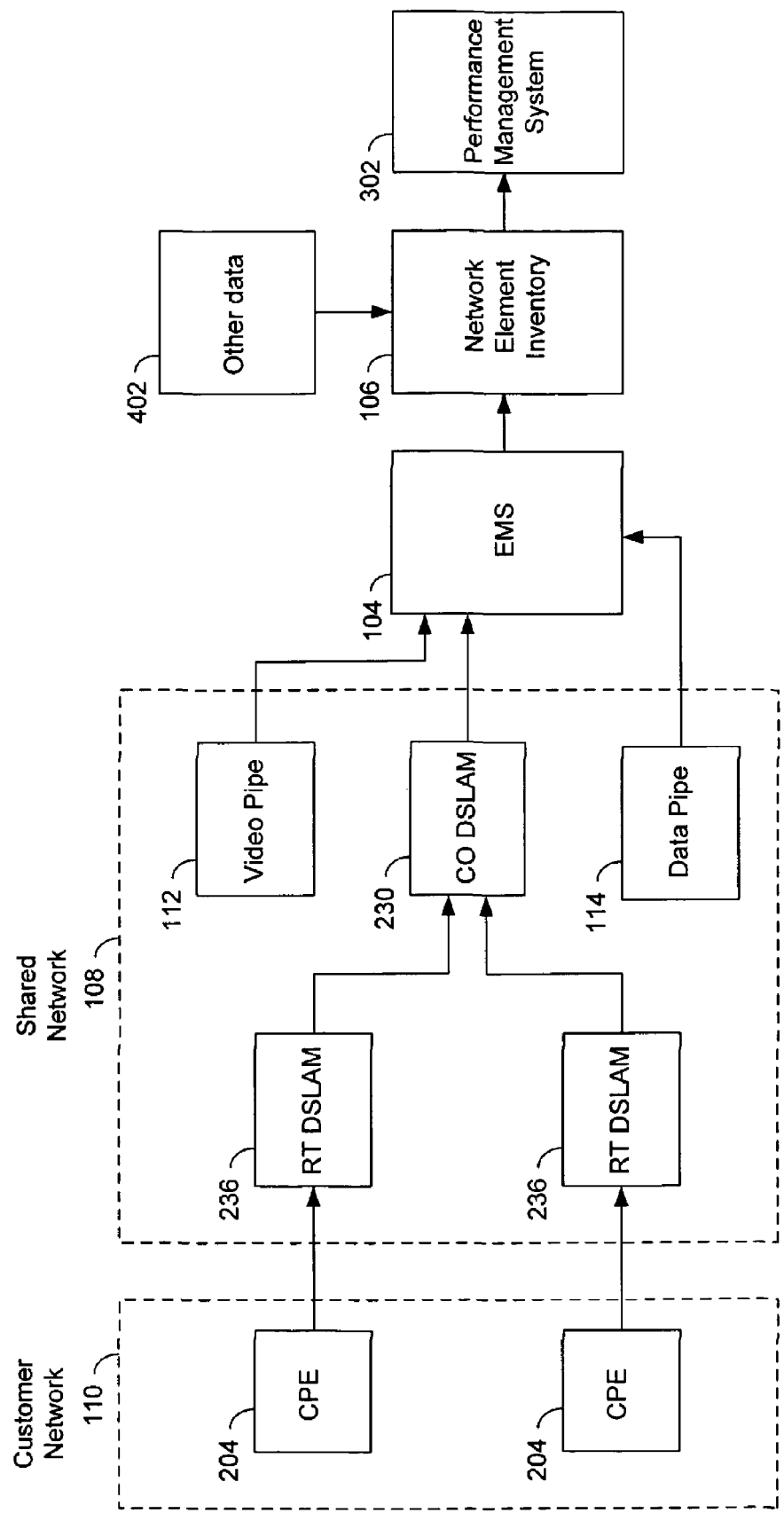
FIG. 4 illustrates one embodiment of a system for managing performance of a video, data and/or telephony network.

FIG. 4 illustrates a system 400 for performance management of network 102 according to one embodiment. As shown, system 400 includes customer network 110, shared network 108, EMS 104, network element inventory 106, customer data 402, and performance management system 302. The illustration of customer network 110 in FIG. 4 has been simplified to include one or more customer premise equipment devices (CPE) 240. CPE 240 may be any equipment included in customer network 110. In one embodiment, CPE 240 includes residential gateway 240 or Etherset (ES) coupled to workstation 249, television 242, and/or telephone 246. The illustration of shared network 108 in FIG. 4 has been simplified to include RT DSLAM 236, CO DSLAM 230, video pipe 112, and data pipe 114. However, shared network 108 may include any equipment included in shared network 108. In one embodiment, shared network 108 is simplified into three clouds, a video cloud, data cloud, and video/data cloud. The video cloud includes any network elements of video pipe 112, the data cloud includes any elements of data pipe 114, and the video/data cloud includes any elements of IOF 204, CO 106, Midloop 208, and customer network 110.

As shown in FIG. 4, only one CPE 240 is coupled to each RT DSLAM 236 and each RT DSLAM 236 is coupled to CO DSLAM 230. However, it should be understood that a plurality (more than two) of CPEs 240 may be coupled to each RT DSLAM 236, and a plurality of RT DSLAMs 236 may be coupled to a CO DSLAM 230. Further, it is contemplated that network 102 may include a plurality of CO DSLAMs 230. However, for simplification purposes, the discussion will address only one CO DSLAM 230.

Video cloud, data cloud, and video/data cloud transfer performance data to EMS 104. EMS 104 provides daily dumps of inventory and performance management data (statistically sampled throughout the day) to network element inventory 106. Additionally, network element inventory 106 may request real-time performance management data or inventory data from any cloud. In one embodiment, network element inventory 106 may use Physical Loop Tests (PLT), Operation And Maintenance (OAM) tests, and capacity checking tests to obtain real-time performance data from any or all components and/or connections in any of the clouds.

Network element inventory 106 also may include or obtain other data 402. Other data 402 may include any customer data relating the customer to performance data. For example, other data 402 may include a customer ID, Network ID, or customer telephone number associated with the performance or inventory data. Additionally, network records or any other data related to network 102 may be included in other data 402. Thus, performance management system 302 uses other data 402 to associate network inventory and performance data to specific customers.

Figure 5:
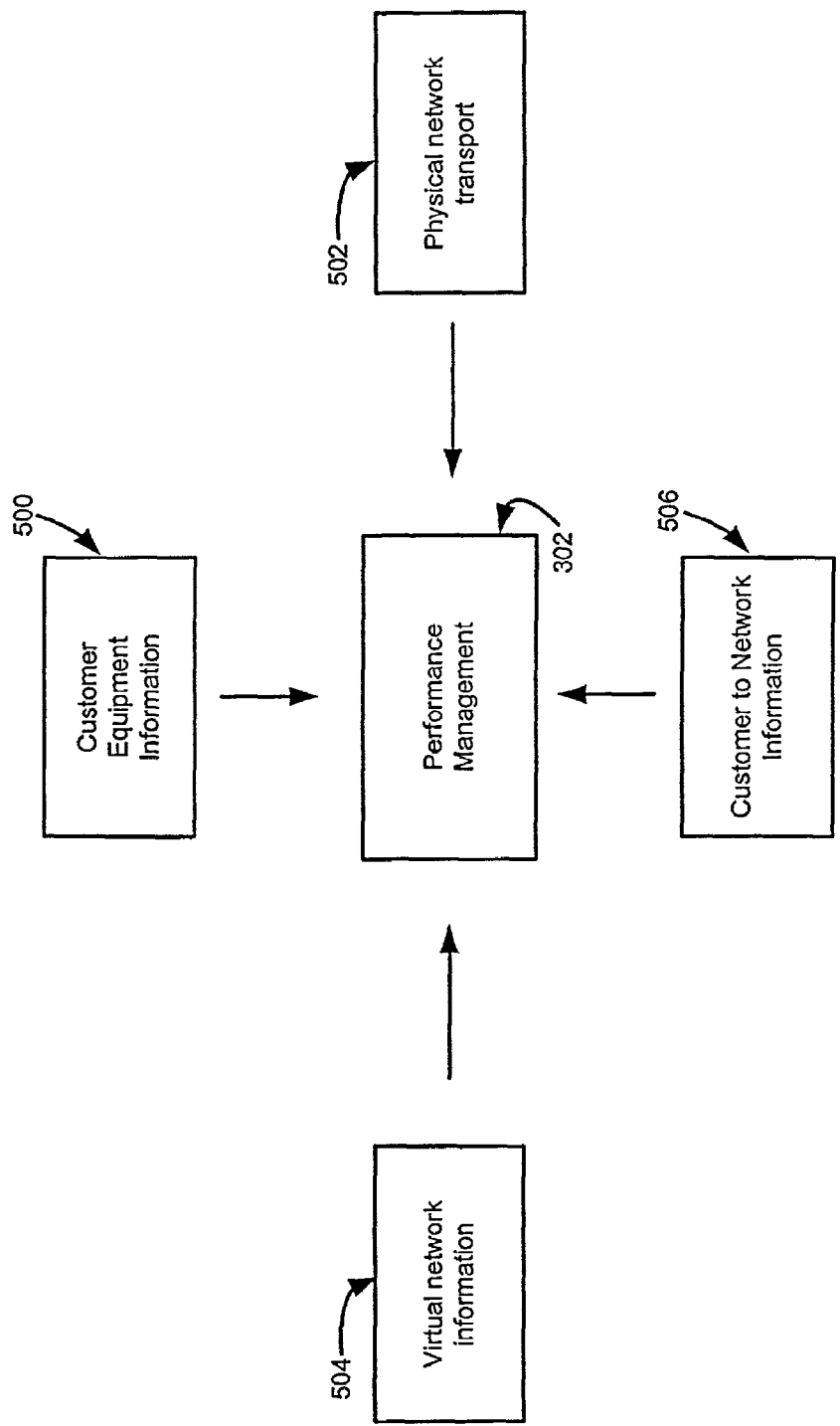
FIG. 5 illustrates an example of network information that may be used by a performance management system.

FIG. 5 illustrates one embodiment of network information that performance management system 302 may use to monitor and manage the performance of network 102. As shown, the network information may include customer equipment information 500, physical network transport information 502, virtual network information 504, and customer to network information 506. Performance management system 302 uses the above information to monitor the operation of the network and to provide service level assurance to customers.

Physical network transport information 502 may include any information related to a physical path from ESP 200 to customer network 110. Physical network transport 502 may include, for example, information about network elements associated with a physical network path for a customer or group of customers through network 102. In one embodiment, physical network transport 502 includes auto-discovered physical inventory data, which is real-time information of the physical network transport of the network. Also, non-real time self-discovered physical inventory data, for example, data from a network database or nightly batch program may be included. Additionally, in one embodiment, construction inventory may be included. Construction inventory comprises planned inventory related to the physical network transport for the entire network, including to the customer locations (i.e., plans on how network 102 was to be built by a construction crew).

Virtual network information 504 may include virtual or logical network information for the entire network. The virtual information includes virtual path assignments and/or IP addresses for network equipment and customers. The virtual or logical path includes information describing how the data is transported through the physical network. In one embodiment, virtual network transport 504 may include auto-discovered virtual inventory data upon request, which is real-time information of the virtual network transport for the network. Also non-real time self-discovered virtual inventory data, for example, data from a network database or nightly batch program may be included. Additionally, in one embodiment, construction inventory and pre-configured settings are included. Construction inventory provides planned inventory related to the virtual network transport for the entire network, including to the customer locations.

Customer to network information 506 may include information that enables performance management system 302 to map customers to the flow of data through the physical network transport and the virtual network transport. In one embodiment, customer network information 506 includes other data 402. Additionally, customer network information 506 allows performance management system 302 to map network faults occurring for one customer to other customers that may be experiencing the same service issues. Additionally, in other embodiments, other systems, such as fault management 302, trouble ticketing 308, and proactive repair 306 may map customers to network faults.

Customer equipment information 500 includes information related to the equipment provided to the customer (CPE 240). Customer equipment information includes the type of device the customer has, and the service level the customer is supposed to receive. For example, the customer may expect to receive data at a certain rate and receive a certain number of video channels. Thus, performance management system 302 needs to know the type of device the customer owns in order to communicate with the device, and needs to know the service levels agreements with the customer in order to validate that the customer is receiving the correct service level. In one embodiment, customer equipment information 500 includes real-time physical sampling of video and data being provided to customers. By monitoring the actual video and data flow to each customer, the system can determine whether the proper service is being provided. For example, service profile characteristics may include threshold values for an assured service level for the customer. The threshold values may be individually tuned to customers or may be standardized across network 102.

The above described information then is used obtain and monitor performance data for each customer or groups of customers. Thus, performance data for identified customer equipment 500, physical network transport 502, and virtual network transport 504 is collected. For example, performance management system 302 collects physical and virtual performance management data for the video/data cloud data, IP performance management data for the data cloud, and video ATM performance management data for the video cloud.

Physical and virtual performance management data for the video/data cloud may include physical and logical information related to the flow through or flow traffic on the self-discovered physical network transport for customers in the entire network. For example, the video/data cloud data may include performance data from CPE 240, routers, RT DSLAM 236, and CO DSLAM 230 for an identified customer, for various groups of customers, or for all customers.

Performance management data for the data cloud includes the flow of IP data through data pipe 114. The data cloud performance management data provides physical or logical data related to the flow of traffic through data pipe 114 for an identified customer, for various groups of customers, or for all customers.

Performance management data for the video cloud includes performance management information about the flow of video ATM data through video pipe 112. The video cloud performance management data provides physical or logical data related to the flow of traffic through video pipe 112 for an identified customer, for various groups of customers, or for all customers.

Figure 6:
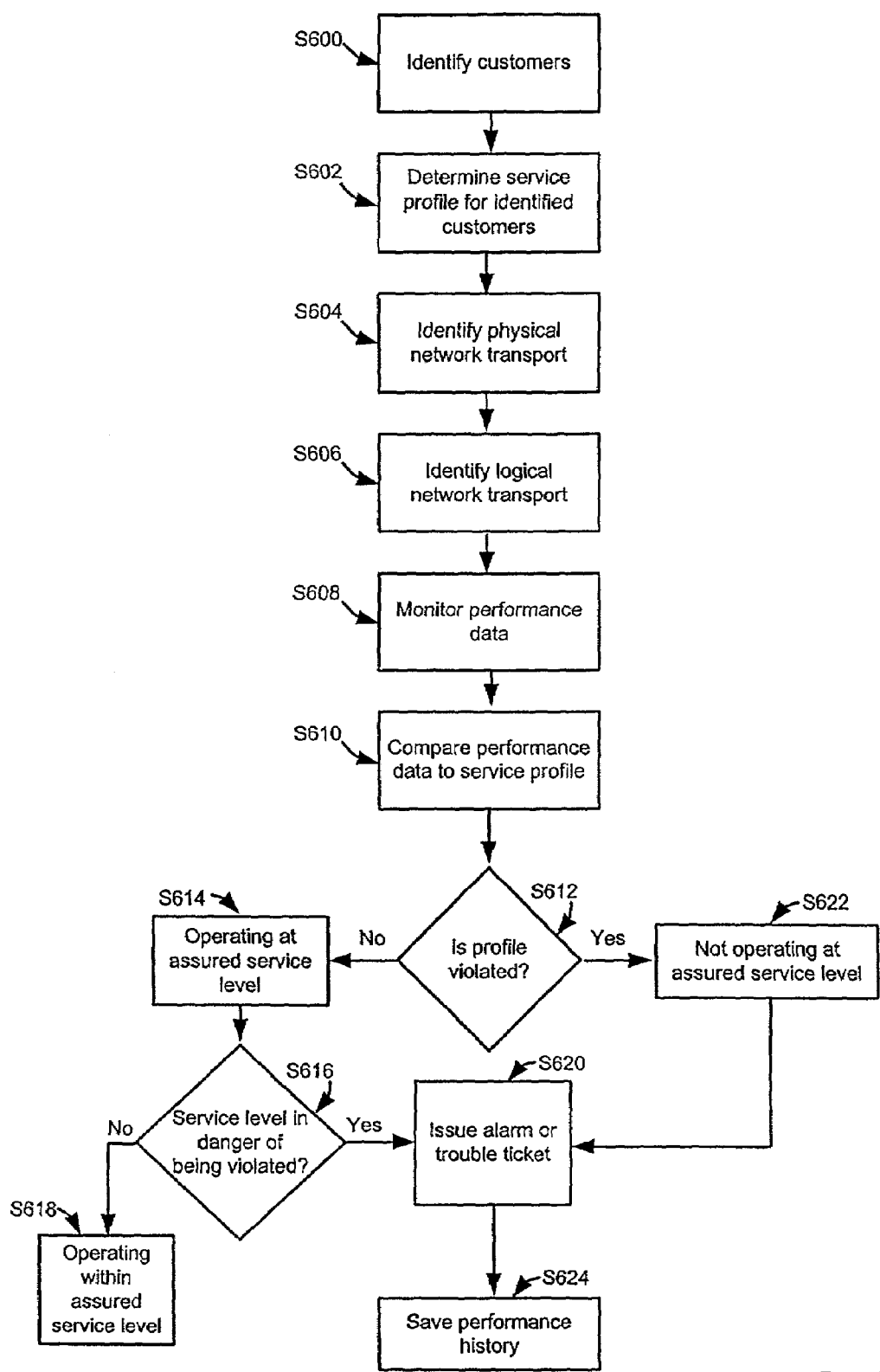
FIG. 6 illustrates one embodiment of a method for monitoring and managing service performance on a network.

FIG. 6 illustrates one embodiment of a method for managing the service performance on network 102. In one embodiment, the performance of xDSL service for customers is managed.

In step S600, one or more customers are identified for performance management. It should be understood that performance management may be performed for any number of customers in network 102 concurrently, including a subset of customers or all customers.

In step S602, a service profile for the identified customers is determined. The service profile includes threshold values for the service. For example, characteristics such as the minimum flow of data through network elements in network 102 for the one or more customers is determined.

In step S604, a physical network transport is identified for the one or more customers. The physical network transport includes a physical path of transport network elements for the one or more customers.

In step S606, a logical network transport through the physical network transport is identified for the one or more customers. Once the logical and physical network transports are identified, performance data is monitored for the logical and physical network transports (Step S608). The performance data may be monitored in real-time and/or non real-time.

In step S610, the performance data is compared with the service profile for the one or more customers. Step S612 determines if the service profile is violated. If the performance data does not violate the service profile, network 102 is operating according an assured service level (Step S614). However, the performance data may indicate that thresholds in the service profile may be in danger of being exceeded (Step S616). If not, network 102 is considered to be operating within the assured service level (Step S618). However, if the service profile is in danger of being exceeded, performance management system 302 may issue an alarm and/or communicate with trouble ticketing 308 so the problem may be monitored (Step S620).

If the performance data does violate thresholds in the service profile, network 102 is not operating at the assured service level (Step S622). For example, utilization of any of the transport network elements may have exceeded the threshold values. In step S620, an alarm is issued or trouble ticketing 308 is contacted.

In step S624, the history of the performance data is saved.

In one embodiment, performance management system 302 may monitor any combination of network clouds and detect when utilization of transport network elements exceed threshold values. If threshold values are exceeded, an alarm or trouble ticket may be issued. Additionally, performance management system 302 provides performance management data that may be used for fault isolation. Also, performance management system 302 may identify a user community impacted by the threshold conditions. Thus, users may be notified of problems before they are detected. Further, performance management system 302 may store performance history data and create reports using the performance history data.

Thus, performance management system 308 is capable of continuously monitoring network 102 for a customer and providing service level assurance. Also, an end-to-end monitoring of customer network 110 and shared network 108 is provided. This ensures that service levels are being met for the entire network 102. Additionally, proactive notification and detection of faults are provided by performance management system 302.

Fault Management System

Fault management system 304 may be any system capable of isolating an alarm or failure. Fault management system 304 receives multiple failures from network 102. However, many of the failures will have been caused by a root cause failure. Thus, fault management system 304 determines the root cause of the failure because rectifying the root cause should resolve other failures caused by the root cause.

Fault management system 304 accesses network element inventory 106 for customer records, network topology records, and a network layer definition. The customer records are used to determine the customers affected by the root cause failure or all other related failures. The network topology includes physical network transport information and is used to correlate the failure to determine failures related to the root cause. The network layer definition includes virtual network transport information and is used to correlate the failure to determine failures related to the root cause. The related failures are then filtered or suppressed by fault management system 304.

Figure 7:
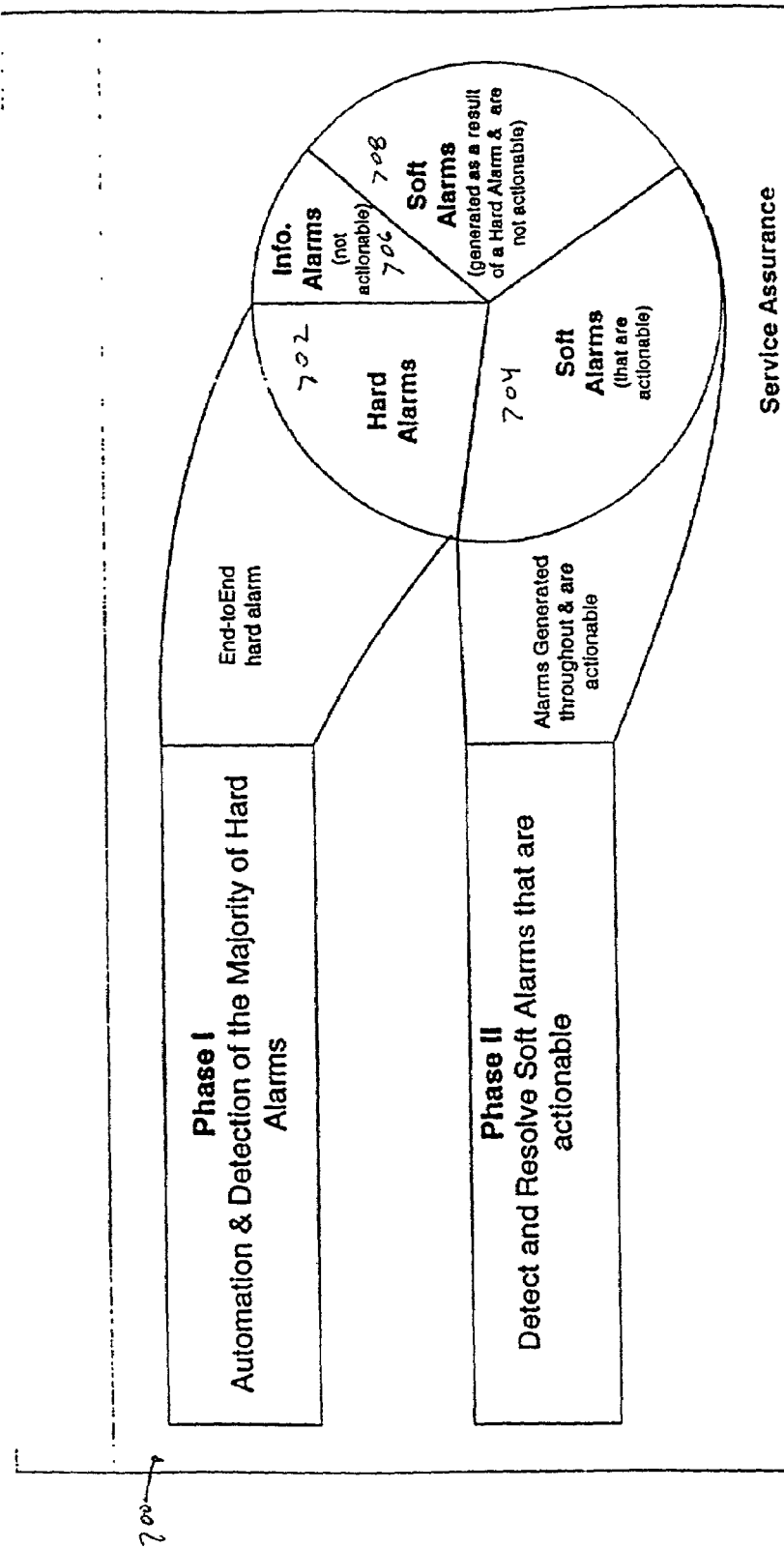
FIG. 7 illustrates a chart of possible alarms.

FIG. 7 illustrates a chart 700 of possible alarms according to one embodiment. As shown, chart 700 includes actionable hard alarms 702, actionable soft alarms 704, unactionable informational alarms 706, and unactionable soft alarms 708.

Informational alarms 706 are not resolvable by fault management system 304 and may be analyzed to predict that a network failure is about to occur. Additionally, unactionable soft alarms 708 are soft alarms that are generated as the result of hard alarms 702. Unactionable soft alarms 708 are not actionable because the root cause of the soft alarm is the hard alarm and once the hard alarm is resolved, the unactionable soft alarm should be resolved. Fault management system 304 does not does not attempt to resolve unactionable soft alarms 708 and informational alarms 706.

Hard alarms 702 are network failures of the physical network. For example, hard failures are equipment failures, such as RT DSLAM 236 port/card failures, cuts of cable/fiber, CPE 240 failure alarms, or any other alarm that does not require additional analysis to determine a root cause. Thus, hard alarms 702 are alarms that do not require any additional analysis to determine a root cause and the hard alarm received is the root cause.

Soft alarms 704 are alarms that require additional intelligence gathering to isolate and resolve the alarm. In one embodiment, soft alarms 704 are failures of the logical network. For example, soft alarms 704 may be service related failures, such as Internet protocol (IP), or Asynchronous Transfer Mode (ATM) failures.

Thus, depending on the failure, fault management system 304 may or may not know if the failure is a root cause. If the failure is a hard failure, fault management system 304 does not need to perform any additional analysis to determine the root cause of the failure. However, if the failure is a soft failure, fault management system 304 may need to perform additional analysis to determine the root cause failure. Accordingly, the fault management system 304 includes processes that query the network to determine and isolate the root cause.

Once the root cause is known, fault management system 304 attempts to resolve the problem created by the root cause. If the problem cannot be automatically resolved by fault management system 304, trouble ticketing system 308 is contacted and a repair ticket is created. The repair ticket is then referred to proactive repair 306.

Figure 8:
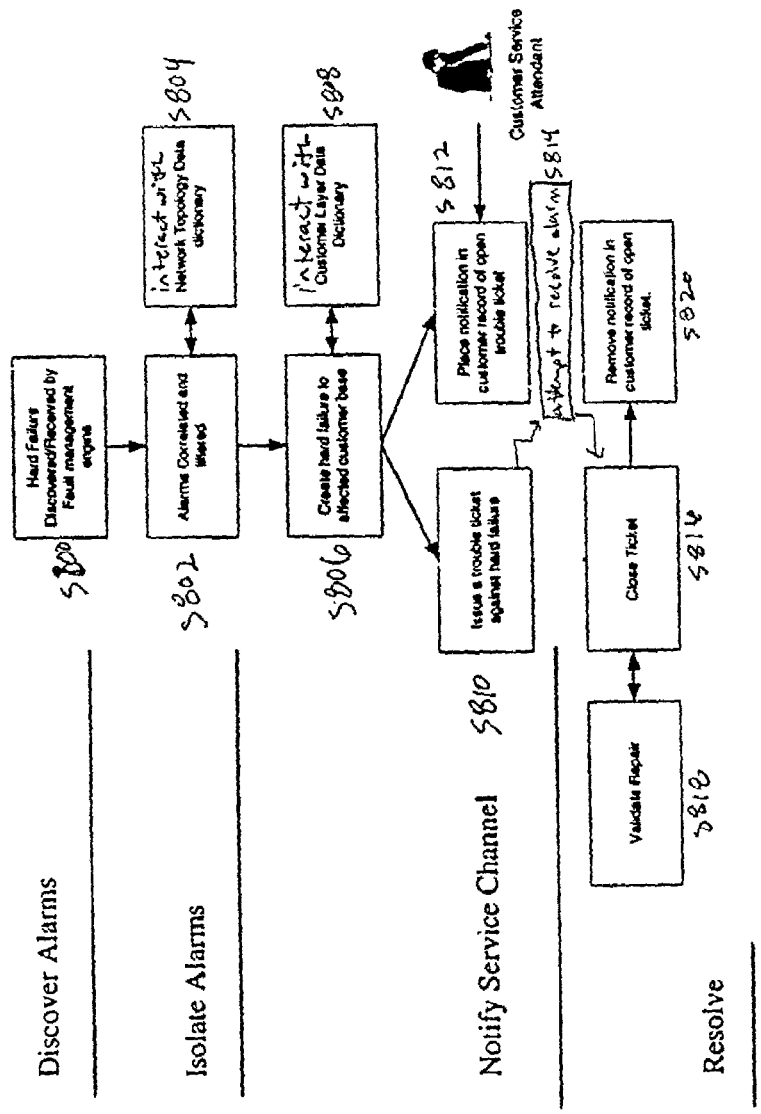
FIG. 8 illustrates one embodiment of a method for monitoring and managing hard fault alarms.

FIG. 8 illustrates a method for fault managing hard alarms 702 according to one embodiment.

In step S800, a hard failure or alarm is discovered or received by fault management system 304. A hard failure does not require any additional analysis and is by definition, the root cause of the failure. In one embodiment, components of the network self-discover the failures and automatically send them to fault management system 304.

Once the hard failure is received, the failure may be used to isolate other alarms. In step S802, the failure is correlated and filtered. In correlating the alarm, the process interacts with the network topology data dictionary in network element inventory 106 to correlate the alarm with other related alarms (Step S804). The network topology dictionary includes a description of physical network elements and how the network elements are physically coupled within network 102. Fault management system 304 uses the hard failure and the network element that generated the hard failure to determine upstream and downstream network elements from the network element that generated the hard failure. Once the upstream and downstream network elements are discovered, alarms from the discovered upstream and downstream network elements may be filtered or suppressed.

Correlating and filtering alarms that are not the root cause allows fault management system 304 to focus on resolving the root cause of the alarm. Once the root cause of the alarm is resolved, other related alarms generated by the root cause failure may be automatically resolved because the related alarms were generated as a result of the root cause alarm. Thus, instead of focusing resources on resolving all alarms in network 102, resources are focused on resolving the root cause failure, which automatically resolves the related failures.

In step S806, a hard failure is created to the effected customer base. The process interacts with the customer layer data dictionary in network element inventory 106 to map, in real time, affected customers against the alarm (Step S808). Thus, all customers affected by the alarm and/or the root cause of the alarm are discovered. Additionally, the process contemplates that once the root cause is known, all customers affected by the root cause are determined, which includes all customers affected by any related failures caused by the root cause.

Once the affected customer base is mapped, trouble ticketing 308 is contacted and a repair ticket is issued against the hard failure (Step S810). Additionally, notification may be placed in all customer records of an open repair ticket (step S812). In one embodiment, this process may be performed automatically by fault management system 304 or a customer service attendant may place notification in the customer records. Both of the above steps, S810 and S812, are accomplished in real time.

Once trouble ticketing 308 is notified, the process attempts to resolve the isolated alarm (Step S814). In resolving the alarm, fault management system 304 may execute a predefined resolution procedure based on a type of the alarm or an alarm number. This process is done automatically by fault management system 304. In one embodiment, the resolution of the failure involves compensating for the failure by re-routing customers affected by the failure to a different route through network 102.

Once the alarm is resolved, trouble ticketing 308 is contacted and the repair ticket is closed (step S816). In step S818, the repair or resolution is validated. In this step, fault management system 304 may validate the alarm by querying network 102 to determine if a failure is still being reported. For example, virtual and physical connectivity tests may be performed. In one embodiment, the tests include OAM and Physical Loop Tests. Once the repair is validated, notification in the customer record of an open ticket is removed (Step S820).

Additionally, the above process may include notification of all customers affected by the hard failure personally. Additionally, all customers affected by the hard failure may be notified that the hard failure has been resolved. All the above steps may be done automatically and in real time without the need for any manual steps. Thus, a process for isolating a hard failure, notifying customers affected by the hard failure, and resolving the hard failure is accomplished automatically.

Figure 9:
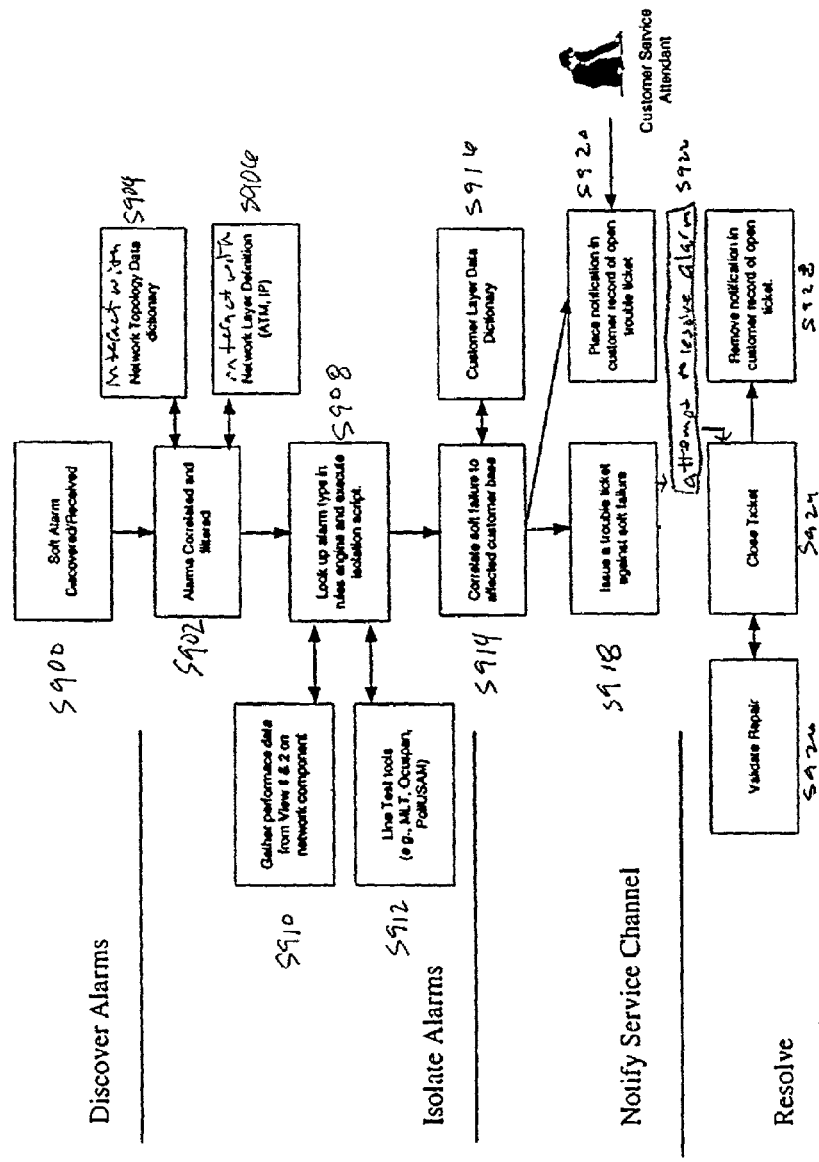
FIG. 9 illustrates one embodiment of a method for monitoring and managing soft fault alarms.

FIG. 9 illustrates a process for fault managing a soft failure according to one embodiment. In step S900, a soft alarm is discovered or received by fault management system 304. Soft failures may be more complicated than hard failures because soft failures may require additional intelligence gathering to isolate and resolve the failure. When a failure is a hard failure, the alarm itself is a root cause alarm and thus, no problem isolation is required. However, when an alarm is a soft alarm, the cause of the alarm is undetermined and additional problem isolation may be required.

Once the soft failure is received, the soft failure may be used to isolate other alarms. In step S902, the failure is correlated and filtered. In correlating the alarm, the process interacts with the network topology data dictionary (Step S904) and the network layer definition in network element inventory 106 to correlate the alarm with other related alarms (Step S906). The network layer definition includes a logical map of the virtual network, such as assignments in video Asynchronous Transfer Mode (ATM) protocols or Internet Protocol (IP)/ATM data protocols. Fault management system 304 uses the soft failure and the network element that generated the soft failure to determine upstream and downstream physical and virtual network elements. Thus, a physical and virtual map of a upstream and downstream network affected by the soft failure is discovered.

Once the upstream and downstream network is discovered, the alarm type is looked up in a rules engine and an isolation script is executed (Step S908). The isolation script isolates a root cause of the failure. In step S910, the isolation script gathers performance data from the network element that produced the soft failure and the upstream and downstream network elements. The performance data may include the speed data is flowing through the network element that produced the soft failure and the discovered upstream and downstream network elements. Thus, fault management system 304 may flag network elements that have violated threshold values and/or experienced a degradation in service levels.

Additionally, in step S912, the isolation rules initiate line test tools, such as such as virtual and physical connectivity tests. For example, Physical Loop Tests and OAM tests are executed. The tools gather data on the network element that produced the soft failure and the discovered virtual and/or physical upstream and downstream network. Fault Management system 304 then analyzes performance management data, test data, and any other relevant data to determine a root cause of the soft alarm.

Correlating and filtering alarms that are not the root cause allows fault management system 304 to focus on resolving the root cause of the alarm. Once the root cause of the alarm is resolved, other related alarms generated by the root cause failure may be resolved because the related alarms were generated as a result of the root cause alarm. Thus, instead of focusing resources on resolving all alarms in network 102, resources are focused on resolving the root cause failure, which automatically resolves the related failures.

In step S914, a soft failure is created to the effected customer base. The process interacts with a customer layer data dictionary in network element inventory 106 to map, in real time, affected customers against the alarm (Step S916). Thus, all customers affected by the alarm and/or the root cause of the alarm are discovered. Additionally, the process contemplates that once the root cause is known, all customers affected by the root cause are determined, which includes all customers affected by any related failures caused by the root cause.

Once the affected customer base is mapped, trouble ticketing 308 is contacted and a repair ticket is issued against the hard failure (Step S918). Additionally, notification may be placed in all customer records of an open repair ticket (step S920). In one embodiment, this process may be performed automatically by fault management system 304 or a customer service attendant may place notification in the customer records. Both of the above steps, S6 and S7, are accomplished in real time.

Once trouble ticketing 308 is notified, the process attempts to resolve the isolated alarm (Step S922). In resolving the alarm, fault management system 304 may execute a predefined resolution procedure based on a type of the alarm or an alarm number. This process is done automatically by fault management system 304. In one embodiment, the resolution of the failure involves compensating for the failure by re-routing customers affected by the failure to a different route through network 102.

Once the alarm is resolved, trouble ticketing 308 is contacted and the repair ticket is closed (step S924). In step S926, the repair or resolution is validated. In this step, fault management system 304 may validate the alarm by querying network 102 to determine if a failure is still being reported. For example, virtual and physical connectivity tests may be performed. In one embodiment, the tests include OAM and Physical Loop Tests. Once the repair is validated, notification in the customer record of an open ticket is removed (Step S928).

Additionally, the above process may include notification of all customers affected by the hard failure personally. Additionally, all customers affected by the hard failure may be notified that the hard failure has been resolved. All the above steps may be done automatically and in real time without the need for any manual steps. Thus, a process for isolating a hard failure, notifying customers affected by the hard failure, and resolving the hard failure is accomplished automatically.

Fault management system 304 may also store alarm history data. Additionally, system 304 is able to create reports using the alarm history.

Fault management system 304 reduces a number of trouble tickets created by CSRs for network related troubles because, in most cases, system 304 has detected a network alarm and already created a trouble ticket before a customer calls the CSRs about the problem. Additionally, fault management system 304 runs unattended without the need of supervision for monitoring and reacting to alarms reported by network 102. Additionally, fault management system 304 supports automatic routing of faults to trouble ticketing 308. Additionally, system 304 supports the capability to automatically notify customers of trouble tickets. Additionally, system 304 supports the capability to automatically notify customers of trouble ticket resolution. In one embodiment, the notification may be by the web, email, CPE 240, or any other system capable of notifying a customer. Additionally, the system has the ability to classify/change alarm types as hard, soft, informational, and unactionable soft. Thus, fault management system 304 proactively detects, resolves, and documents faults in network 102.

Proactive Repair

Proactive repair system 306 receives indications of faults from fault management 304 and/or performance management 302. Additionally, proactive repair system 306 may receive faults from outside sources, such as customers through a web interface, customer service representatives that have received repair request calls from customers, or outside consultants. However, proactive repair system 306 is designed to facilitate the repair of faults in network 102 before contact from outside sources is received.

In one embodiment, proactive repair system 306 receives faults that are not automatically resolvable by fault management system 304. However, proactive repair system 306 may receive indications of faults directly. In most cases, a technician is dispatched by proactive repair system 306 to repair the fault. However, proactive repair system 306 may be able to diagnose a fault and self-heal network 102. In situations where a technician is dispatched, it is desired to minimize the time taken to repair a fault. Thus, proactive repair system 306 attempts to minimize repair time by collecting and correlating data from network 102 and providing a pre-defined resolution procedure based on the fault and the data. Data may be, for example, test results from virtual and physical connectivity tests, performance data, and customer data. Also, in one embodiment, proactive repair system 306 follows fault management system's 304 process for isolating and correlating hard and soft alarms of network 102.

In one embodiment, proactive repair system 306 performs physical and virtual connectivity tests. The physical connectivity test evaluates the connectivity of physical network elements of network 102. In one embodiment, the physical connectivity test is a Physical Loop Test (PLT). The virtual connectivity test evaluates the connectivity of virtual network elements of network 102. In one embodiment, the virtual connectivity test is an OAM test. In another embodiment, the physical and virtual connectivity tests may have been performed by fault management system 304 and thus, the tests may be unnecessary. In order to perform the tests, proactive repair system 306 and fault management system 304 access and run the tests directly without supervision or monitoring.

Typically, the physical connectivity test is coupled with a traditional Plain Old Telephone Service (POTS) repair tool. Thus, the repair tool must be accessed to perform the test. However, accessing the tool is time-consuming and costly. Therefore, in one embodiment, the physical connectivity test is de-coupled from the POTS repair tool. The test is then performed without having to access the POTS repair tool. Additionally, results from the test are not tied to the POTS repair tool and may be stored in a centralized database, such as network element inventory 106.

In one embodiment, a PLT is performed when a POTS card is located within RT DSLAM 236.

Typically, the virtual connectivity test requires discovering a Network Interface Card (NIC) address for a network access device (i.e., CPE 240). Using the NIC ID, customer account information may be retrieved and then the virtual connectivity test is performed using the customer account information. Accordingly, performing the test is time-consuming and complicated. However, network element inventory 106 correlates data for a customer so proactive repair system 306 may perform the virtual connectivity test using a service area identifier, such as a telephone number. Instead of locating a corresponding network element, a NIC ID of CPE 240, and customer account information to test the virtual connectivity, the virtual connectivity test is automatically performed using the service area identifier. The relevant information for the test has been correlated allowing the test to be run with only the service area identifier. For example, from the identifier, the test may access network element inventory 106 and receive the NIC ID and customer account information needed to perform the test.

Figure 10:
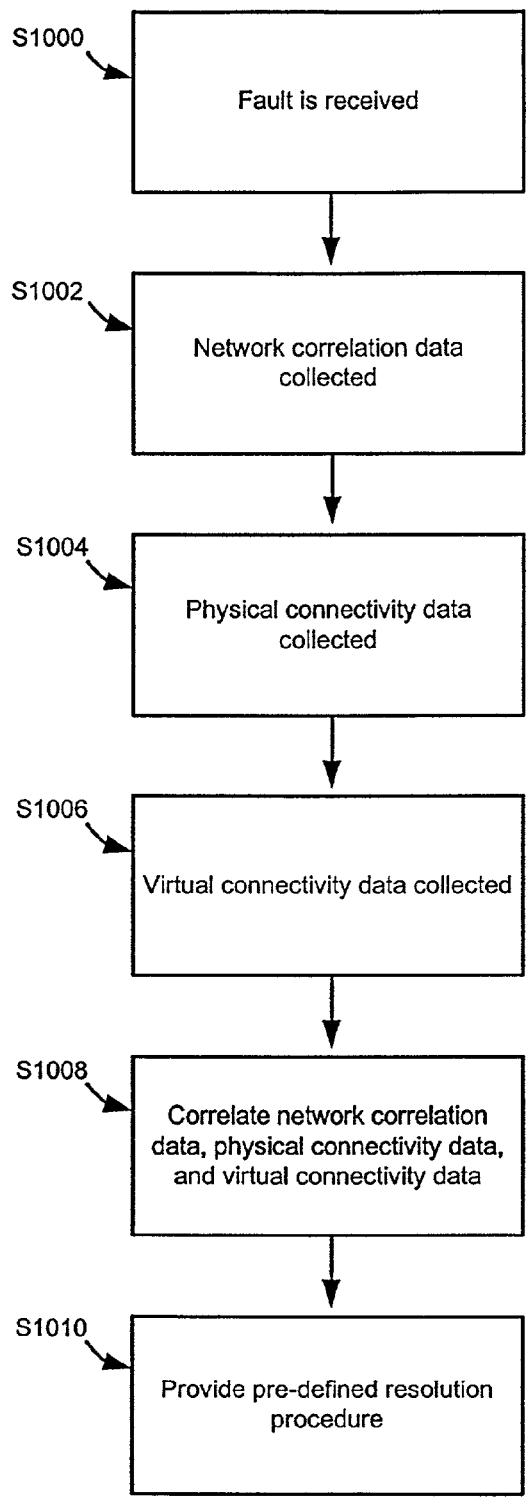
FIG. 10 illustrates one embodiment of a method for proactively managing a fault.

FIG. 10 illustrates a method for proactively managing a fault according to one embodiment. In step S1000, a fault is received by proactive repair system 306. In one embodiment, the fault has already been processed by fault management system 304. Thus, fault management system 304 may have produced data, such as network correlation data, usable by proactive repair system 306. Network correlation data may be, for example, root cause analysis data identifying a network element that caused the fault, correlated upstream and downstream physical and virtual network transport information and a list of customer's affected by the fault and related faults. In another embodiment, proactive repair 306 performs the processes as described in the section labeled fault management to correlate network data to the fault.

In step S1002, network correlation data collected.

In step S1004, physical connectivity data is collected from a physical connectivity test performed on network 102. Proactive repair system 306 performs the test using the network correlation data. In one embodiment, the test is performed on the upstream and downstream physical network transport.

In step S1006, virtual connectivity data is collected from a virtual conductivity test performed on network 102. Once again, proactive repair system 306 performs the test using the network correlation data. In one embodiment, the test is performed on the upstream and downstream virtual network transport.

In step S1008, network correlation data, physical connectivity data, and virtual connectivity data is correlated based on the fault.

In step S1010, a predefined resolution procedure is provided based on the fault, network correlation data, physical connectivity data, and virtual connectivity data. The predefined resolution procedure provides steps for a technician to follow in order to resolve the fault. A predefined procedure may include how to replace the defective network component in a network element. For example, work steps describing how to resolve the fault are provided for a technician.

Fault Management system 304 allows network 102 to self-discover faults and attempt to resolve the faults. However, if the faults are not automatically resolved, proactive repair system 306 receives the fault and provides an opportunity for quick resolution by a technician. The system correlates data, tests the network, and provides a predefined resolution strategy. Thus, a fault may be resolved before a customer service representative is contacted by an outside customer experiencing the fault.

Proactive Service Request Management and Measurement

Referring to FIG. 3, trouble ticketing system 308 is coupled to fault management system 304, proactive repair system 306, performance management system 302, and network element inventory 106. Additionally, trouble ticketing 308 is coupled to a customer service system (not shown).

Trouble ticketing 308 may receive indications of faults from fault management 304, proactive repair system 306, and performance management system 302. Additionally, the indications of the faults may include any proactive analysis the sending system had performed on the fault. For example, the analysis may include a root cause analysis, performance data, steps taken to resolve the fault, where the fault originated, a list of customers affected by the fault, etc. Once receiving the fault, trouble ticketing 308 creates a repair ticket for the fault and groups customers affected by the fault to the repair ticket. Customer service is then notified of the fault and the list of customers. Also, fault management 304, proactive repair system 306, and performance management system 302 are notified of the fault. Additionally, any analysis that was done may be passed on to the customer service.

Thus, trouble ticketing 308 provides a centralized system for synchronizing the proactive network systems and customer service center. Therefore, when a fault is detected, fault management 304, proactive repair system 306, performance management system 302, and trouble ticketing 308 are all notified of the fault and system handling the fault. By synchronizing the systems, redundant operations for repairing the fault are avoided. For example, fault management system 304 may discover a fault and begin to automatically resolve the fault. That fault may be or may have a root cause that has caused many other faults. Additionally, customer service may receive calls from customers that have detected problems for the fault discovered by fault management system 304 and other related faults. Accordingly, customer service may unknowingly dispatch technicians to repair the faults because they are not aware of the repair efforts of fault management 304, proactive repair system 306, and performance management system 302. Also, multiple calls may be received and multiple technicians dispatched to repair the problem. Further, it is possible that other systems, such as performance management 306 and proactive repair system 306, may detect a fault or related fault and initiate an independent repair process. Thus, multiple systems may be actively attempting to repair faults caused by the root cause fault.

Trouble ticketing 308 synchronizes fault management 304, proactive repair system 306, performance management system 302, and customer service preventing redundant efforts to repair the problem. Once a fault is detected by either fault management 304, proactive repair system 306, and performance management system 302, a root cause fault is isolated and correlated with other faults. Additionally, a list of customers affected by all the faults is generated. Once the fault is received by trouble ticketing system 308, a repair ticket is created and communicated to fault management 304, proactive repair system 306, performance management system 302, and customer service. Thus, all systems know what the other systems are doing preventing redundant repair operations.

Additionally, customer service representatives (CSRs) fielding complaints from customers experiencing network problems related to the fault will already know of the fault has been detected and the status of the fault. The CSR handling the call may also use all the information generated from the proactive network process assist the customer. Also, because all tests were performed by fault management 304, proactive repair system 306, and performance management system 302, the CSR does not have to waste time performing any tests or analysis. Thus, customer contact time is reduced and customers are more satisfied.

Figure 11:
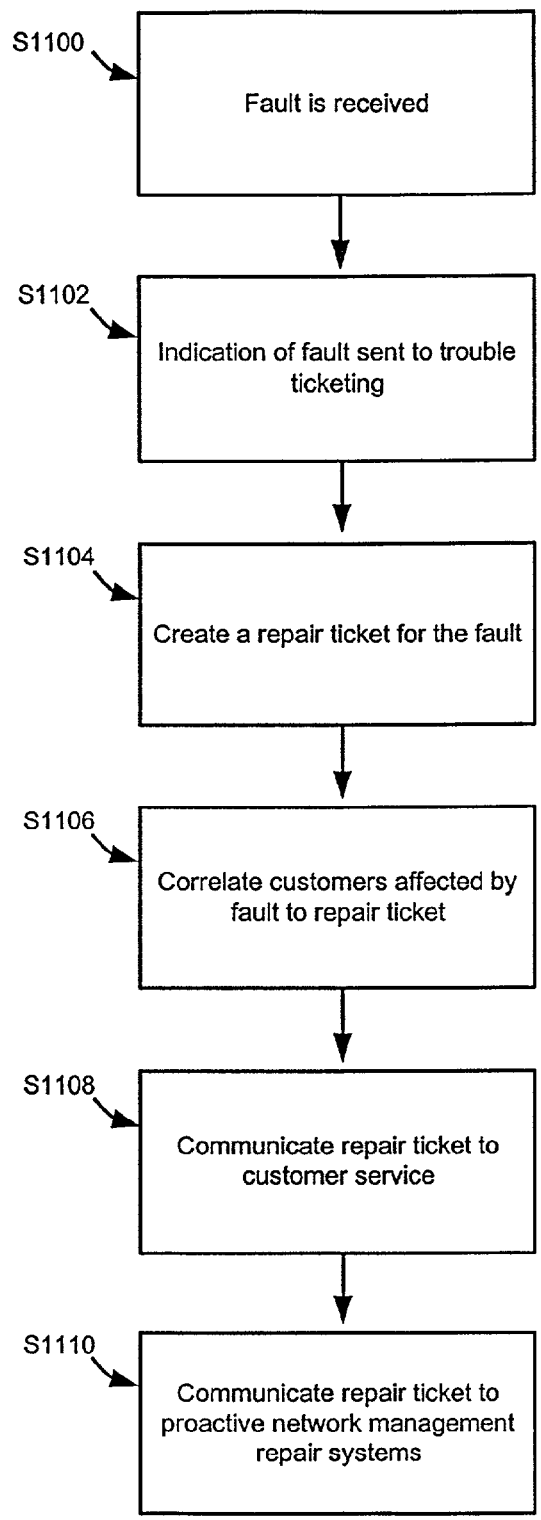
FIG. 11 illustrates one embodiment of a method for managing a proactive repair process.

FIG. 11 illustrates a method for managing a proactive repair process according to one embodiment. In step S1100, a fault is detected by a proactive network repair system, such as fault management 304, proactive repair system 306, and performance management system 302. In one embodiment, the detecting system may perform additional analysis on the fault. For example, a root cause analysis, correlation of performance data, and correlation of a list of customers affected by the fault, etc. may be performed.

In step S1102, an indication of the fault is sent to trouble ticketing system 308. Once receiving the indication, trouble ticketing 308 creates a repair ticket for the fault and any related faults. In step S1104, customers affected by the fault are correlated to the repair ticket. In one embodiment, if the list of customers affected by the fault was not already created, trouble ticketing 308 performs the analysis. Correlating customers to the repair ticket notifies any system communicating with the correlated customers that a repair ticket has been created for the customers and the repair process is being addressed.

In step S1106, the repair ticket is communicated to the customer service system. Additionally, the correlated list of customers is provided. The communication is preferably received before a customer calls the customer service system. Also, in step S1108, the repair ticket is communicated to the proactive network systems that did not detect the fault.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope and equivalents.

What is claimed is:

1. A method for managing failures in a video and data network comprising:
   discovering a failure in the video and data network, wherein the failure is a root cause;
   after discovering the root cause failure, correlating the root cause failure with one or more failures to determine related failures that are generated as a result of the root cause failure;
   determining one or more customers using the video and data network affected by the root cause failure;
   wherein determining one or more customers affected by the failure comprises using customer data to correlate the one or more customers to the failure;
   suppressing the related failures;
   determining if the root cause failure is automatically resolvable; and
   if the root cause failure is automatically resolvable, resolving the root cause failure, wherein resolving the root cause failure resolves the related failures.

2. The method of claim 1, wherein the video and data network comprises a Digital Subscriber Line (xDSL) network.

3. The method of claim 1, wherein the video and data network comprises a Very high bit rate DSL (VDSL) network.

4. The method of claim 1, further comprising creating a repair ticket for the root cause failure.

5. The method of claim 1, wherein correlating the failure comprises:
   interacting with a physical network transport inventory; and
   determining upstream and downstream physical network elements from the failure.

6. The method of claim 5, wherein correlating the failure comprises:
   correlating related failures from the upstream and downstream physical network elements with the failure.

7. The method of claim 1, further comprising notifying the one or more customers affected by the failure.

8. The method of claim 1, further comprising opening a repair ticket in one or more records of the one or more customers affected by the failure.

9. The method of claim 8, further comprising determining when the failure was resolved.

10. The method of claim 9, further comprising closing the repair ticket in the one or more records of the one or more customers affected by the failure when the failure has been resolved.

11. The method of claim 10, further comprising notifying the one or more customers affected by the failure when the failure is resolved.

12. The method of claim 9, further comprising validating the resolution of the failure.

13. The method of claim 12, wherein validating the resolution of the failure comprises testing a physical connectivity of the video and data network.

14. The method of claim 12, wherein validating the resolution of the failure comprises testing a virtual connectivity of the video and data network.

15. The method of claim 1, further comprising storing the failure in a history of failures.

16. A method for managing alarms in a video and data network comprising:
   receiving an alarm from a network element in the video and data network;
   determining if the alarm is a root cause alarm;
   if the alarm is not a root cause alarm, determining the root cause alarm, the root cause alarm being a root cause of the alarm;
   correlating the root cause alarm with one or more alarms to determine related alarms generated as a result of the root cause alarm;
   determining one or more customers receiving services from the video and data network that are affected by the root cause alarm;
   wherein determining one or more customers affected by the alarm comprises using customer data to correlate the one or more customers to the alarm;
   determining if the root cause alarm is automatically resolvable; and
   if the root cause alarm is automatically resolvable, resolving the root cause alarm, wherein the resolution resolves any alarms affecting the one or more customers receiving services from the video and data network, wherein the one or more alarms are resolved by resolving the root cause alarm.

17. A telecommunications device for managing failures in a video and data network, the telecommunications device comprising:
   logic to discover a failure in the video and data network, wherein the failure is a root cause
   after discovering the root cause failure, logic to correlate the root cause failure with one or more failures to determine related failures that are generated as a result of the root cause failure;
   logic to determine one or more customers using the video and data network affected by the root cause failure;
   wherein logic to determine one or more customers affected by the failure comprises logic to use customer data to correlate the one or more customers to the failure;
   logic to suppress the related failures;
   logic to determine if the root cause failure is automatically resolvable; and
   if the root cause failure is automatically resolvable, logic to resolve the root cause failure, wherein resolving the root cause failure resolves the related failures.

18. The telecommunications device of claim 17, wherein the video and data network comprises a Digital Subscriber Line (xDSL) network.

19. The telecommunications device of claim 17, wherein the video and data network comprises a Very high bit rate DSL (VDSL) network.

20. The telecommunications device of claim 17, further comprising logic to create a repair ticket for the root cause failure.

21. The telecommunications device of claim 17, wherein logic to correlate the failure comprises:
   logic to interact with a physical network transport inventory; and
   logic to determine upstream and downstream physical network elements from the failures.

22. The telecommunications device of claim 17, further comprising logic to notify the one or more customers affected by the failure.

* * * * *